United States Patent
Kawada et al.

(10) Patent No.: US 7,356,940 B2
(45) Date of Patent: Apr. 15, 2008

(54) ELASTIC FIXTURE AND ATTACHMENT METHOD FOR LENGTH MEASURING APPARATUS

(75) Inventors: Hiroaki Kawada, Kawasaki (JP); Hiroatsu Mori, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 11/177,408

(22) Filed: Jul. 11, 2005

(65) Prior Publication Data

US 2006/0016088 A1    Jan. 26, 2006

(30) Foreign Application Priority Data

Jul. 20, 2004    (JP) .............. 2004-212103

(51) Int. Cl.
   *G01B 11/00*    (2006.01)
   *G01D 21/00*    (2006.01)

(52) U.S. Cl. ........................................ 33/706

(58) Field of Classification Search ........... 33/706–708
   See application file for complete search history.

(56) References Cited

U.S. PATENT DOCUMENTS

| | | | | |
|---|---|---|---|---|
| 2,861,345 A | * | 11/1958 | Spencer | 33/707 |
| 2,875,524 A | * | 3/1959 | Bower et al. | 33/708 |
| 3,600,811 A | * | 8/1971 | Weyrauch | 33/707 |
| 3,675,331 A | * | 7/1972 | Ernst et al. | 33/707 |
| 3,816,002 A | * | 6/1974 | Wieg | 33/707 |
| 4,060,903 A | * | 12/1977 | Ernst | 33/706 |
| 4,070,759 A | * | 1/1978 | Nelle | 33/706 |
| 4,198,757 A | * | 4/1980 | Nelle et al. | 33/706 |
| 4,530,157 A | * | 7/1985 | Nelle | 33/707 |
| 4,776,098 A | | 10/1988 | Nelle | |
| 4,843,729 A | * | 7/1989 | Nagaoka et al. | 33/708 |
| 4,912,856 A | | 4/1990 | Ernst | |
| 5,016,359 A | * | 5/1991 | Nagaoka et al. | 33/706 |
| 5,488,782 A | * | 2/1996 | Ochiai | 33/708 |
| 6,904,696 B2 | * | 6/2005 | Boge et al. | 33/706 |
| 2003/0056387 A1 | | 3/2003 | Kawada | |

FOREIGN PATENT DOCUMENTS

| | | | | |
|---|---|---|---|---|
| DE | | 3634677 A1 | * | 4/1988 |
| DE | | 3640676 A1 | * | 6/1988 |
| EP | | 314940 A1 | * | 5/1989 |
| EP | | 421401 A1 | * | 4/1991 |
| JP | | 01227905 A | * | 9/1989 |
| JP | A-2003-097936 | | | 4/2003 |
| JP | A-2004-301541 | | | 10/2004 |

* cited by examiner

*Primary Examiner*—Christopher W Fulton
(74) *Attorney, Agent, or Firm*—Oliff & Berridge, PLC

(57) ABSTRACT

An elastic fixture which is employed for attaching a length measuring apparatus to an object to be measured having a different linear expansion coefficient therefrom. The elastic fixture is elastically deformable in the lengthwise direction of the length measuring apparatus. The elastic fixture includes a sheet-metal curved beam having one end fixedly attached to the length measuring apparatus and the other end fixedly attached to the object to be measured. The sizes and the machining accuracy of the elastic fixture are less restricted, and the elastic fixture can be manufactured easily. In addition, the elastic fixture is applicable to relatively severe temperature environments in a manual machine tool or the like. Further, the sizes and the cost of the elastic fixture can be reduced as compared with a parallel spring mechanism.

3 Claims, 6 Drawing Sheets

CENTRAL PORTION
(Fixed by intermediate-portion fixing block)

(A)

(B)

(C)

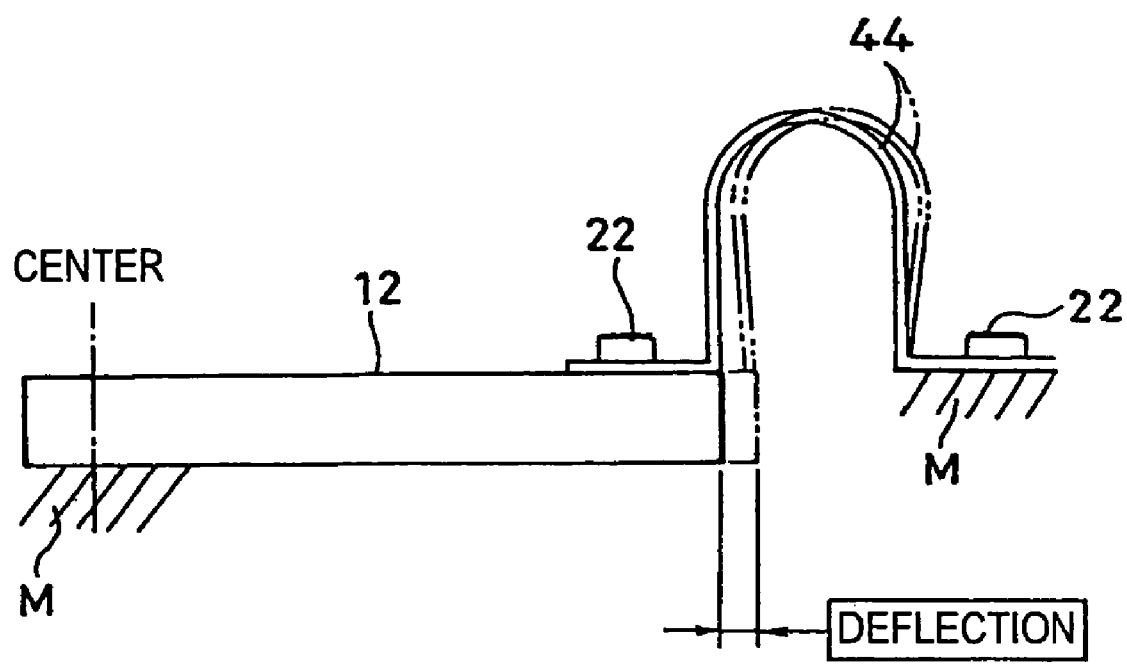

ELASTIC FIXTURE AND ATTACHMENT METHOD FOR LENGTH MEASURING APPARATUS

CROSS-REFERENCE TO RELATED APPLICATION

The disclosure of Japanese Patent Application No. 2004-212103 filed Jul. 20, 2004 including specification, drawings and claims is incorporated herein by references in its entirety.

BACKGROUND OF THE INVENTION

1. Field of the Invention

The present invention relates to an elastic fixture and an attachment method for mounting a length measuring apparatus on an object to be measured having a different linear expansion coefficient from that of the apparatus. In particular, the present invention relates to an elastic fixture for a length measuring apparatus which is suitably employed in a unit type linear scale fixedly attached, along with a main scale made of glass contained in a frame made of aluminum, to a machine body made predominantly of iron, and which can absorb large thermal stresses caused by the difference in linear expansion coefficients. The present invention also relates to a method of attaching a length measuring apparatus by means of the elastic fixture.

2. Description of the Related Art

A unit type linear scale (herein after referred to as a linear scale) of a multi-point fixing type, such as shown in FIG. 1, has been known as a linear scale for feed-back control employed in a relatively large machine tool or industrial machine in which the generation of vibration or shock, or the like is expected.

In general, the linear scale (a length measuring apparatus) 10 includes a frame 12 made of aluminum and a detection head 16. The frame 12 contains a main scale made of glass. The detection head 16 contains a detection unit, such as an index scale, which is relatively movable with respect to the frame 12. Both the frame 12 and the defection head 16 are securely attached to a stage sliding unit of a machine body (not shown) through, for example, screws 20.

When the ambient temperature of the linear scale 10 securely attached in the manner described above is changed, thermal stress caused by the difference in linear expansion coefficients is generated between the aluminum frame 12 of the linear scale 10 and the iron machine body. Thus, deflections and distortions are generated in the frame 12 and the glass scale contained within the frame 12. In addition, the screws 20 securely attaching the frame 12 may be loosened, and the relative position with respect to the machine body may be changed. These may result in the deterioration of the measurement accuracy. Therefore, a mechanism for reducing the thermal stress should be provided in the fixing portions of the frame 12.

In order to solve the above problems, the present applicant has proposed an example of the attachment mechanism for the frame 12 in Japanese Patent Laid-Open Publication No. 2003-97936. This attachment mechanism is illustrated in FIG. 2 (a perspective view), FIG. 3 (an enlarged front view of a III-portion of FIG. 2), and FIG. 4 (a schematic illustration of the operating state).

In this example, an intermediate-portion fixing block 30 for permanent attachment is provided on a central portion of the frame 12 for maintaining the relative alignment with respect to a mating plane 8 of the machine body. In addition, an end-portion fixing block 32 is provided on each of both the ends of the frame 12. The end-portion fixing block 32 includes a parallel plate spring mechanism 34 for reducing the thermal stress connected to the frame 12 via a plate spring mechanism 13 of the frame 12.

In the case of employing the fixing block 32 described above, even when the frame 12 is expanded due to the ambient temperature change, the thermal stress is absorbed and reduced (relieved) through the deformations of a plate spring 13A of the plate spring mechanism 13 and plate springs 34A and 34B of the parallel plate spring mechanism 34, as shown in FIG. 4. In addition, since the frame 12 is permanently attached by the intermediate-portion fixing block 30 at the center, the relative alignment with respect to the mating plane 8 is unchanged.

However, the functions, as a plate spring, of the plate spring mechanism and the parallel plate spring mechanism disclosed in Japanese Patent Laid-Open Publication No. 2003-97936 strongly depend on the materials of parts, thicknesses T1 and T2 of the plate spring, the lengths L1 and L2 of the plate spring, and the like. Therefore, the sizes of the parts and the machining accuracy of the parts are restricted, and the parts are difficult to manufacture. As a result, for example, the reduction of the sizes of the end-portion fixing block 32 in the cross-sectional direction in FIG. 3 and the reduction of the parts cost are difficult to achieve.

In addition, a unit type linear scale for a manual machine tool is required to be used in relatively severe temperature environments. In order to apply the spring mechanisms to this unit type linear scale for a manual machine tool, the temperature range and the limit of the applicable length should be improved.

BRIEF SUMMARY OF THE INVENTION

In view of the foregoing problems, various embodiments of this invention provide a attaching technique of a length measuring apparatus in which the sizes and the machining accuracy thereof are less restricted, which can be manufactured easily and is applicable to use in relatively severe temperature environments in a manual machine tool or the like, and of which the sizes and the cost can be reduced as compared with the parallel plate spring mechanism.

To achieve the above object, various embodiments of the invention provide an elastic fixture which is employed for attaching a length measuring apparatus to an object to be measured and is elastically deformable in the lengthwise direction of the length measuring apparatus. The elastic fixture comprises a sheet-metal plate spring having one end fixedly attached to the length measuring apparatus and the other end fixedly attached to the object to be measured.

In the present invention, the above sheet-metal plate spring may be formed by a curved beam having a U-shape.

Various embodiments of the invention also provide a method of attaching a length measuring apparatus by use of the above elastic fixture.

Various embodiments of the invention also provide a method of attaching a length measuring apparatus by use of the above fixture and a sheet-metal permanent fixture not having a plate spring function.

According to various embodiments of the invention, in order to attach a length measuring apparatus to an object to be measured having a different linear expansion coefficient therefrom, employed is an elastic fixture including a sheet-metal plate spring mechanism elastically deformable in the longitudinal direction of the length measuring apparatus.

Therefore, the sizes and the machining accuracy of the fixture are less restricted, and the elastic fixture can be manufactured easily. In addition, the elastic fixture is applicable to relatively severe temperature environments in a manual machine tool or the like. Further, the sizes and the cost of the elastic fixture can be reduced as compared with the parallel spring mechanism.

These and other novel features and advantages of the present invention will become apparent from the following detailed description of preferred embodiments.

BRIEF DESCRIPTION OF THE DRAWINGS

The preferred embodiments will be described with reference to the drawings, wherein like elements have been denoted throughout the figures with like reference numerals, and wherein:

FIG. 8 is a schematic drawing showing the operation state according to the embodiment.

DESCRIPTION OF THE PREFERRED EMBODIMENT

Various embodiments of this invention will be hereinafter described in detail with reference to the drawings.

Figure 1:
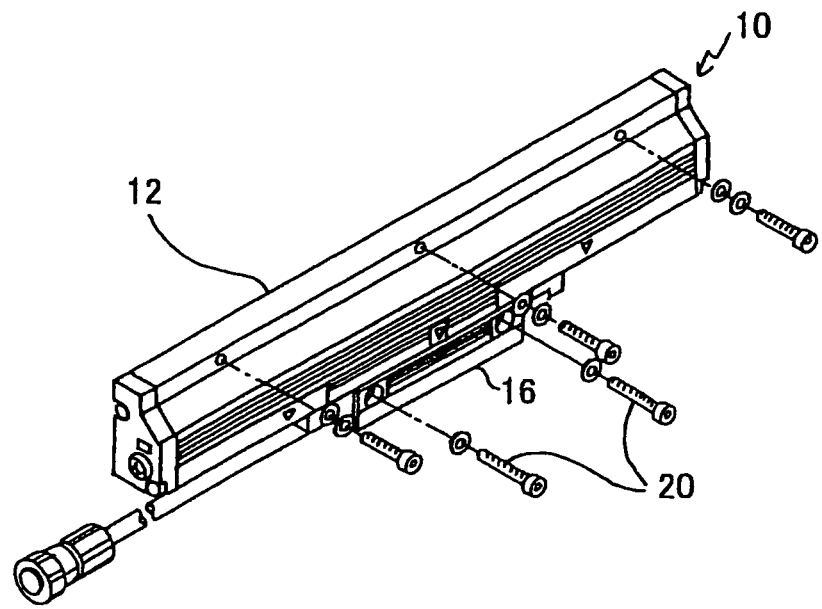
FIG. 1 is an exploded perspective view showing an exemplary configuration of a conventional unit type linear scale.
Figure 2:
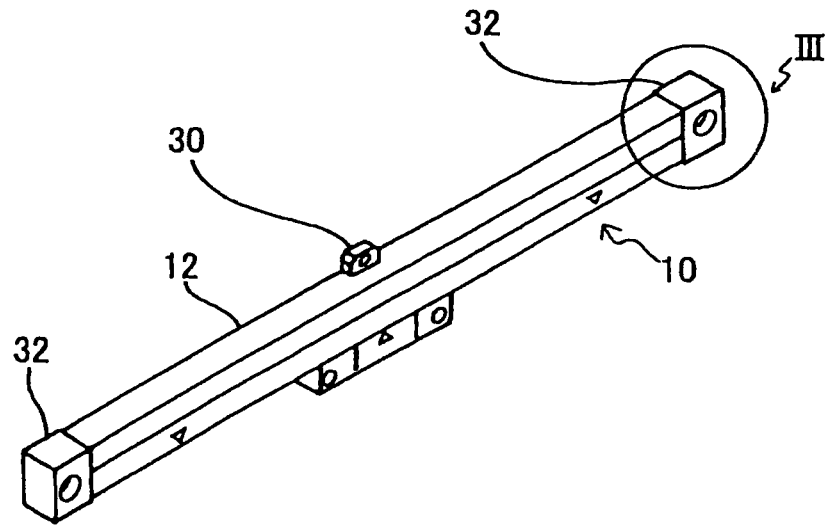
FIG. 2 is a perspective view showing an example of a frame fixing mechanism of a comparative example proposed by the present applicant.
Figure 3:
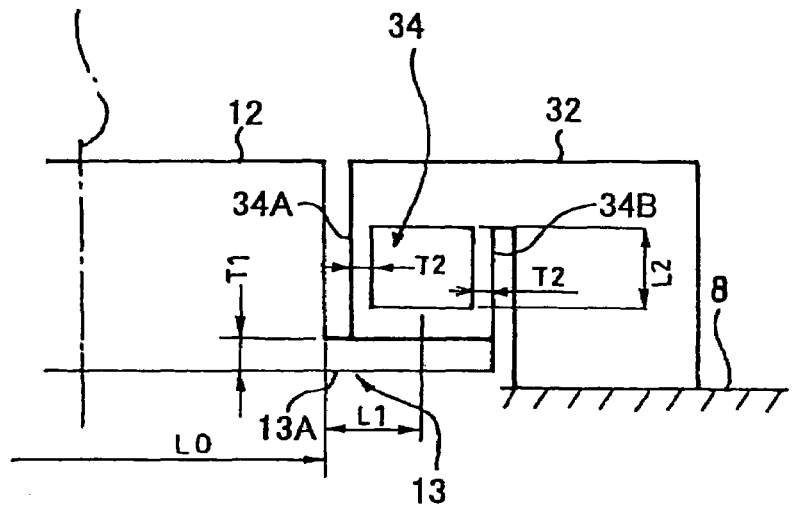
FIG. 3 is an enlarged front view of a III-portion of FIG. 2.
Figure 4:
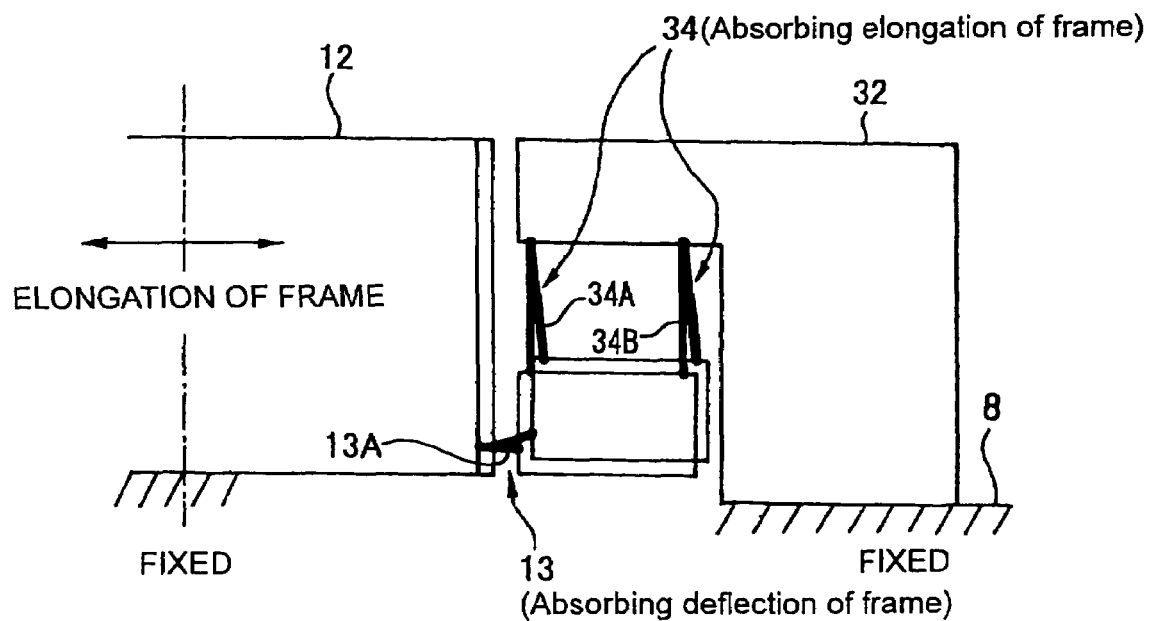
FIG. 4 is a schematic drawing showing the operation state of the comparative example shown in FIGS. 2 and 3.
Figure 5:
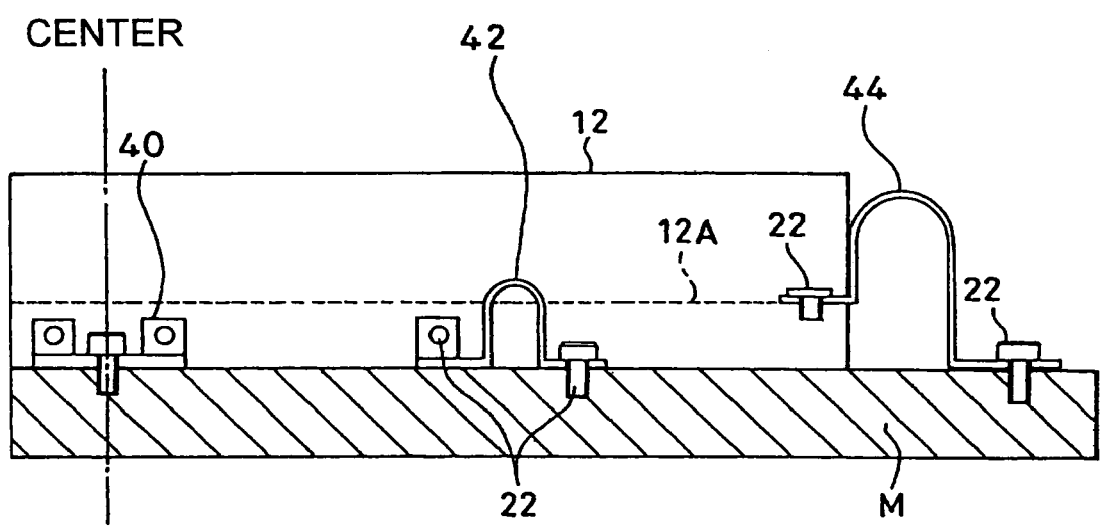
FIG. 5 is a front view showing a partial configuration according to an embodiment of the present invention.

FIG. 5 schematically shows a state in which a unit type linear scale (a length measuring apparatus) 10 is attached to a mating machine (an object to be measured) M by use of elastic fixtures of the embodiment of the present invention.

In this embodiment, a permanent fixture 40 formed by a sheet-metal part is disposed at the center of an aluminum frame 12 for permanent fixation. Also, a curved beam 42 or 44 made of a sheet metal is disposed at each of a plurality of locations, including both ends of the frame 12 (only one end is shown in FIG. 5), in the lengthwise direction of the frame 12.

Figure 6:
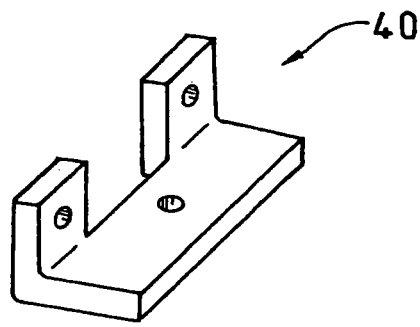
FIGS. 6A, 6B, and 6C are schematic perspective views showing the features of the sheet-metal fixtures.
Figure 6:
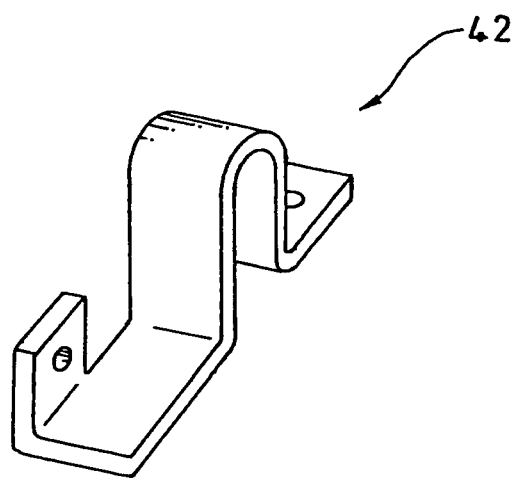
Figure 6:
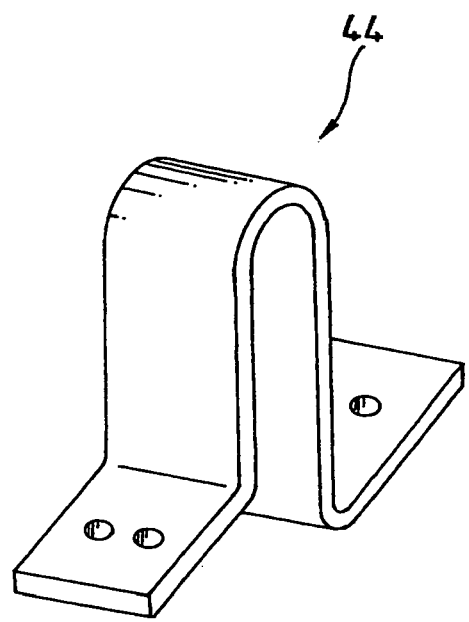

FIGS. 6A to 6C are schematic perspective views of the sheet-metal parts 40, 42, and 44, respectively. The holes represented by a circle in FIGS. 6A to 6C are tapped holes. The permanent fixture 40 and the curved beam fixture 42 are made of a sheet-metal part. One end of the permanent fixture 40 or the curved beam fixture 42 is fixedly attached to the side surface of the aluminum frame 12 with a screw 22, and the other end thereof is securely attached to a mating machine (an object to be measured) with another screw 22, as shown in FIG. 5.

Figure 7:
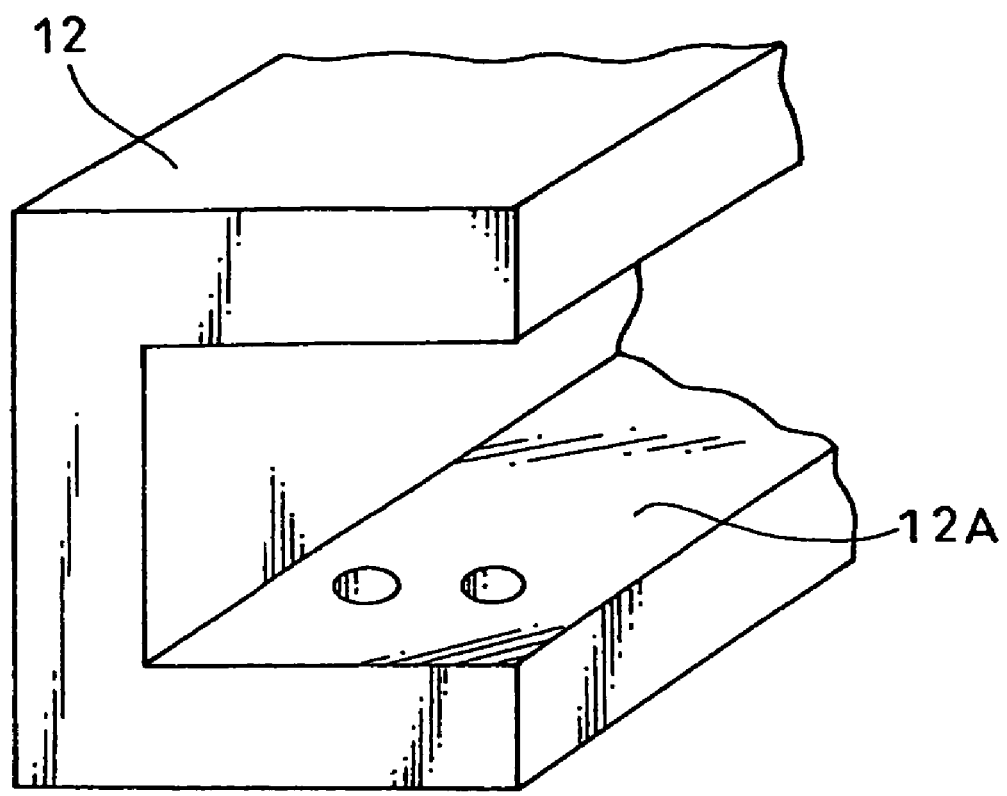
FIG. 7 is an enlarged perspective view showing an end of an aluminum frame.

The curved beam fixture 44 is disposed on the longitudinal end of the aluminum frame 12. One end of the curved beam fixture 44 is fixedly attached to a lower frame 12A, which is enlarged in a perspective view of FIG. 7, with a screw 22, and the other end thereof is fixedly attached to the mating machine through another screw 22.

According to the attachment method described above, when the ambient temperature of the mating machine M having the aluminum frame 12 securely attached thereto is changed, the central portion of the frame 12 moves integrally with the machine M. At the other portions of the frame 12, the curved beam fixture(s) 44 is(are) elastically deflected (the motion of the edge is schematically shown in FIG. 8.) by the relative elongation difference caused by the difference between the thermal expansion coefficients of the frame 12 and the mating machine M, and thus the relative elongation difference is absorbed by this mechanism. The curved beam fixture 42 disposed at the midway portion between the center and the end portion also absorbs relative elongation difference in the same manner as above. Therefore, the reference position for elongation and contraction of the aluminum frame 12 can be clearly defined, and also the generation of the thermal stresses can be suppressed.

The parallel plate spring mechanism disclosed in Japanese Patent Laid-Open Publication No. 2003-97936 described above can be applied to an aluminum frame 12 having a length of approximately 1 m. If an elastic fixture employing the similar mechanism proposed by the present applicant in Japanese Patent Laid-Open Publication No. 2004-301541 is employed, an aluminum frame 12 having a longer overall length can be employed. However, since a block must be externally attached to the side surface of the aluminum frame 12, the cross-sectional sizes of a scale unit become larger.

On the other hand, in the case of the elastic fixture employing the curved beam mechanism according to the present embodiment, the cross-sectional sizes of a scale unit are not required to be large. In addition, the elastic fixture is applicable to a longer frame (for example, approximately 2 m).

Since the conventional parallel plate spring mechanism is produced from a block-like material through milling or the like, the manufacture thereof is difficult. To the contrary, the curved beam mechanism of the invention can be produced through sheet-metal working, and thus the manufacture thereof is easier than the conventional one, resulting in the reduction in the cost.

Since the curved beam mechanism can absorb a larger amount of elongation than the conventional parallel plate spring, the curved beam mechanism can be advantageously employed with less restriction on the sizes and the cost for a manual machine tool in which the length measuring apparatus operated in relatively severe temperature environments, or for the aluminum frame 12 having a longer length, wherein the allowance of the elastic deflection for absorbing the elongation of the frame 12 must be changed.

The U-shaped curved beam was employed as a sheet-metal plate spring in the embodiment described above. However, a plate spring having any shape can be employed so long as the plate spring is produced through sheet-metal working. Although the absorbed amount of elongation is smaller than that in the U-shaped curved beam, a plate spring which is, for example, bent generally perpendicularly as in the parallel plate spring may be employed.

The position for fixing the aluminum frame 12 by means of the permanent fixture 42 not having plate spring functions is not limited to the center of the aluminum frame 12. Of course, the fixing position may be changed to any position in the lengthwise direction.

It should be apparent to those skilled in the art that the above-described embodiments are merely illustrative which represent the application of the principles of the present invention. Numerous and varied other arrangements can be readily devised by those skilled in the art without departing from the spirit and the scope of the invention.

What is claimed is:

1. An elastic fixture for attaching a length measuring apparatus to an object to be measured, the fixture being elastically deformable in a lengthwise direction of the length measuring apparatus, the elastic fixture comprising: a sheet-metal plate spring formed by a curved plate having a U-shape and fixing portions with a hole at both ends, one fixing portion being firmly fixed to the length measuring apparatus by a screw and the other fixing portion being firmly fixed to the object to be measured by a screw.

2. A method of attaching a length measuring apparatus to an object to be measured comprising using an elastic fixture including a sheet-metal plate spring formed by a curved plate having a U-shape and fixing portions with a hole at both ends, one fixing portion being firmly fixed to the length measuring apparatus by a screw and the other fixing portion being firmly fixed to the object to be measured by a screw.

3. A method according to claim 2, further comprising a sheet-metal permanent fixture not having a plate spring function to fix the center portion of the apparatus to the object to be measured.

\* \* \* \* \*